United States Patent
Gregory

(10) Patent No.: US 10,781,948 B1
(45) Date of Patent: Sep. 22, 2020

(54) PIPE CONNECTOR WITH ANNULAR COMMUNICATION

(71) Applicant: TRINITY BAY EQUIPMENT HOLDINGS, LLC, Houston, TX (US)

(72) Inventor: David Gregory, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/673,022

(22) Filed: Nov. 4, 2019

(51) Int. Cl.
*F16L 21/06* (2006.01)
*F16L 33/23* (2006.01)

(52) U.S. Cl.
CPC ............ *F16L 21/065* (2013.01); *F16L 33/23* (2013.01); *Y10T 29/49826* (2015.01)

(58) Field of Classification Search
CPC ....... F16L 39/005; F16L 21/065; F16L 19/06; F16L 19/065; F16L 19/08; F16L 19/12; F16L 21/007; F16L 21/06; F16L 21/08; F16L 23/036; F16L 17/04; F16L 37/088; F16L 37/091; F16L 37/12; F16L 19/041; F16L 47/12; F16L 23/08; F16L 33/23; F16L 33/22; Y10T 29/49826
USPC .......... 285/123.13, 236, 242, 335, 337, 341, 285/364, 366, 368, 406, 412, 411, 420, 285/421, 373
See application file for complete search history.

(56) References Cited

U.S. PATENT DOCUMENTS 3,367,683 A * 2/1968 Mattson ................... F16L 33/23
285/243
3,495,855 A * 2/1970 Currie ..................... F16L 33/23
285/253

6,993,819 B2 2/2006 Homann
9,273,811 B1 * 3/2016 Webber ............... F16L 33/2071
2004/0177486 A1 9/2004 Homann
2015/0316187 A1 11/2015 Matsubara

FOREIGN PATENT DOCUMENTS

| CA | 2319921 | 1/2007 |
| CN | 102313109 | 6/2013 |
| CN | 203273128 | 11/2013 |
| CN | 205689952 | 11/2016 |

(Continued)

OTHER PUBLICATIONS http//www.victaulic/products/style-905-coupling-plain-end-hdpe-pipe/; 4 pages; printed Mar. 16, 2020.

*Primary Examiner* — Zachary T Dragicevich
*Assistant Examiner* — William S. Choi
(74) *Attorney, Agent, or Firm* — Greenberg Traurig, LLP; Dwayne L. Mason; Mark G. Chretien

(57) ABSTRACT

A compression type pipe connector for joining a pipe segment to another node in a pipeline or another pipeline segment. The connector has pipe connector compression segments that are extricably and interlockingly connected to one another to form a fluid-tight seal therebetween. The pipe connector is configured to form an outer bore through which fluids transported, disposed or trapped within an annulus formed within a multi-layered flexible pipeline can flow through while providing a central bore through which hydrocarbons transported through the inner diameter of the pipeline can flow. The segments of the pipe connector are connected together via vertical and horizontal compression bolts to effect a fluid-tight seal between the connector segments.

20 Claims, 3 Drawing Sheets

(56) References Cited

FOREIGN PATENT DOCUMENTS

| | | |
|---|---|---|
| CN | 206830998 | 1/2018 |
| CN | 206846135 | 1/2018 |
| CN | 208237271 | 12/2018 |
| CN | 109114326 | 1/2019 |
| CN | 208457422 | 2/2019 |
| DE | 10249808 | 5/2004 |
| EP | 1457726 | 11/2005 |
| EP | 1596117 | 11/2005 |
| EP | 2876342 | 5/2015 |
| EP | 2813739 | 1/2017 |
| JP | 3843288 | 11/2006 |
| KR | 2001081758 | 8/2001 |
| KR | 20110096758 | 8/2011 |
| KR | 2018000562 | 1/2018 |
| WO | 2007/123306 | 11/2007 |
| WO | 2012/141321 | 10/2012 |

\* cited by examiner

PIPE CONNECTOR WITH ANNULAR COMMUNICATION

CROSS-REFERENCE TO RELATED APPLICATIONS

None.

FIELD OF THE INVENTION

The embodiments described herein relate to mechanical couplings and coupling elements for joining pipes, pipe components, flexible pipes, pipelines, midline fittings, midline couplings, end-fittings, intermediate pipe and piping elements to other pipes, flexible pipes, pipelines, midline fittings, midline couplings, end-fittings, intermediate pipe, pipe components, piping elements and fixtures to transport fluids under pressure, fluids including hydrocarbons, water, mud, natural gas, and other fluids utilized in the oil-well services industry.

BACKGROUND

A pipe connector can be used to connect pipes to form a pipeline. Pipe connectors are useful for connecting unbonded flexible pipe, which can be used to transmit fluid such as a production fluid like oil or gas from one location to another. Such flexible pipe can be used for offshore purposes as well as onshore or over land purposes.

One or more embodiments of the present invention relate to an apparatus and method for securing one flexible pipe to another flexible pipe in an end-to-end configuration, or another pipe component. One or more embodiments of the present invention relate to an apparatus and method for joining lengths of flexible pipe together to form a pipeline whereby liquids and gasses can be transported within a central bore region. One or more embodiments also relate to an apparatus and method for joining lengths of flexible pipe wherein liquids and/or gasses disposed in a separate annular region formed between one or more layers of the pipes disposed around the central bore of the pipe can be transported along a length of pipe safely without damaging the pipeline. One or more embodiments of the present invention utilizes a connector that can be lockingly connected to ends of two lengths of pipe such that respective central bores and annulus regions of both lengths are communicatively connected to one another via the connector such that fluids, gasses and liquids can be transmitted through the lengths of pipe under pressure while maintaining the integrity of the fluid pathways formed in the bore and annulus regions of the lengths of pipe.

There are many uses for unbonded flexible pipe in the oil well services industry and other industries wherein there is a need to transport fluids under high pressure, both across land and at depths underneath the ground and at sea. For example, hydrocarbons, such as oil or gas, and other production fluids are produced under pressure and transported across distances from one location to another using flexible pipe. Such flexible pipe can be used for offshore purposes as well as onshore or over land purposes. Typically, such flexible pipe includes an inner fluid retaining layer, often referred to as a liner or barrier layer, which helps prevent fluid flow radially outwards from the bore. This layer has an inner diameter defining a bore along which fluid can flow. One or more armor layers are typically formed around the fluid retaining layer. The armor layer or layers are typically, but not exclusively, formed by winding steel strip about the fluid retaining layer. The armor layer or layers provide pressure reinforcement to prevent burst through of the inner fluid retention layer as well as preventing collapse of the flexible pipe due to external pressures.

Additionally, the armor layer can provide tensile strength to resist longitudinal forces of either extension or contraction on the flexible pipe. The flexible pipe also typically includes an outer sheath which is arranged to prevent ingress of fluid and/or contaminants from an environment where the flexible pipe is located.

The region between the outer sheath and inner fluid retaining layer defines an annulus region extending along the length of the portion of flexible pipe in which the armor layer or layers are located. One problem associated with the transportation of fluids across distances is that more than one length of pipe can be required to deliver the fluid to the intended destination. Thus, various types of pipe connectors and other pipe components are integrated along the pipeline to perform various functions and operate to connect the lengths of pipe to other lengths of pipe, mid-line fittings and end fittings. However, as the fluid is under pressure, conventional pipe couplings and connectors, utilized to connect lengths of pipe to other lengths of pipe and various mid-line and end fittings, may be negatively impacted due to the stresses of the fluid and forces that act upon the interface between the end of the pipe section and the connector and the interface between connector components utilized to effect the connection.

Pipelines are also being put in service for longer periods of time as the production of hydrocarbons requires exploration in locations that are increasingly difficult to reach. During production of hydrocarbons or the transportation of fluids across the ground, the duties of a pipeline technician include the coupling and decoupling of pipeline sections.

Additionally, gas, which originates from the transported fluid, can permeate through the fluid retaining layer and collects in the annular region. Also, where the flexible pipe is utilized in an environment including undesirable gas, such gas can permeate through the outer sheath and likewise be trapped in the annulus region. These trapped gases can collect in the annulus of the pipe and, on occasion, can degrade performance of the flexible pipe over time. For this reason, gases trapped in the annulus of un-bonded flexible pipe require venting.

SUMMARY

One or more embodiments of the present invention concern pipe connectors and couplings for joining a plurality of pipe segments together to form a pipeline. One or more other embodiments concern end-line pipe connectors for joining a pipeline and pipeline segments to other nodes disposed in a pipeline. One or more embodiments include a pipe connector including a first pipe compression connector segment and a second pipe compression connector segment. In one or more embodiments, the first and second pipe connector segments comprise a middle section including first and second opposing sides, first and second opposing ends, an inner surface, and an outer surface. In one or more embodiments, the inner surface forms a cavity with a radius of curvature configured to engage an outer diameter of an end of a pipe. In one or more embodiments, a first flange disposed on and extending away from the first side has a number of holes extending therethrough. In one or more embodiments, a second flange disposed on and extending away from the second side has a number of holes extending therethrough. In one or more embodiments, an inner compression connector, disposed within the cavity of the first and second pipe connector segments, includes a first end, a second end, an inner surface and an outer surface. In one or more embodiments, the inner surface of the inner compression connector forms a central bore, and the outer surface of the inner compression connector is configured to engage an inner diameter of an end of a pipe. In one or more embodiments, a plurality of vertical compression bolts engages the holes extending through the first and second flanges to connect the first and second flanges. In one or more embodiments, an outer bore is formed between the inner cavity formed within the inner surface of first and second pipe connector segments and the outer surface of the inner compression connector.

One or more other embodiments concern midline pipe connectors for joining two pipeline segments to other nodes disposed in a pipeline. One or more embodiments include a third pipe compression connector segment and a fourth pipe compression connector segment. In one or more embodiments, the connected first and second pipe compression connector segments are extricably and interlockingly connected to third and fourth pipe compression connector segments to form a fluid-tight midline pipeline connector. In one or more embodiments, each of the third and fourth pipe connector segments comprise a middle section including first and second opposing sides, first and second opposing ends, an inner surface, and an outer surface. In one or more embodiments, the inner surface of the third and fourth connector segments forms a cavity with a radius of curvature configured to engage an outer diameter of an end of a pipe. In one or more embodiments, a first flange disposed on and extending away from the first side has a number of holes extending therethrough. In one or more embodiments, a second flange disposed on and extending away from the second side has a number of holes extending therethrough. In one or more embodiments, a plurality of vertical compression bolts configured to engage the holes extending through the first and second flanges of the third and fourth connector segments are utilized to connect the first and second flanges of the third and fourth connector segments. In one or more embodiments, a second outer bore is formed between the inner cavity formed within the inner surface of third and fourth pipe connector segments and the outer surface of the inner compression connector. In one or more embodiments, horizontal compression bolts are utilized to extricably and interlockingly connect first and second connected pipe compression connector segments to third and fourth pipe compression connector segments to form a fluid-tight midline pipeline connector.

One or more other embodiments concern midline and end-line pipe connectors for joining two pipeline segments and a pipeline or pipeline segment, respectively, to other nodes disposed in a pipeline. In one or more embodiments, the connector provides for the separate communication of fluids within the pipe connector 1. In one or more embodiments, fluids (e.g., liquids, hydrocarbons or gasses) disposed or trapped within the annulus of a pipeline or a pipeline segment connected to the pipeline are communicated through the fluid-tight and sealingly connected outer bores OB1 and OB2 formed in the pipe connector when the connected first and second pipe compression connector segments are extricably and interlockingly connected to third and fourth pipe compression connector segments to form a fluid-tight midline pipeline connector. In one or more embodiments, fluids transported within the inner diameter of a pipeline segments connected to the pipe connector are communicated through the fluid-tight and sealingly connected central bores formed in the pipe connector. In one or more embodiments, the fluids disposed within outer bores formed in the pipe connector and the fluids disposed within central bores in the pipe connector are kept separate from one another when each is disposed within the pipe connector.

DETAILED DESCRIPTION

Figure 1:
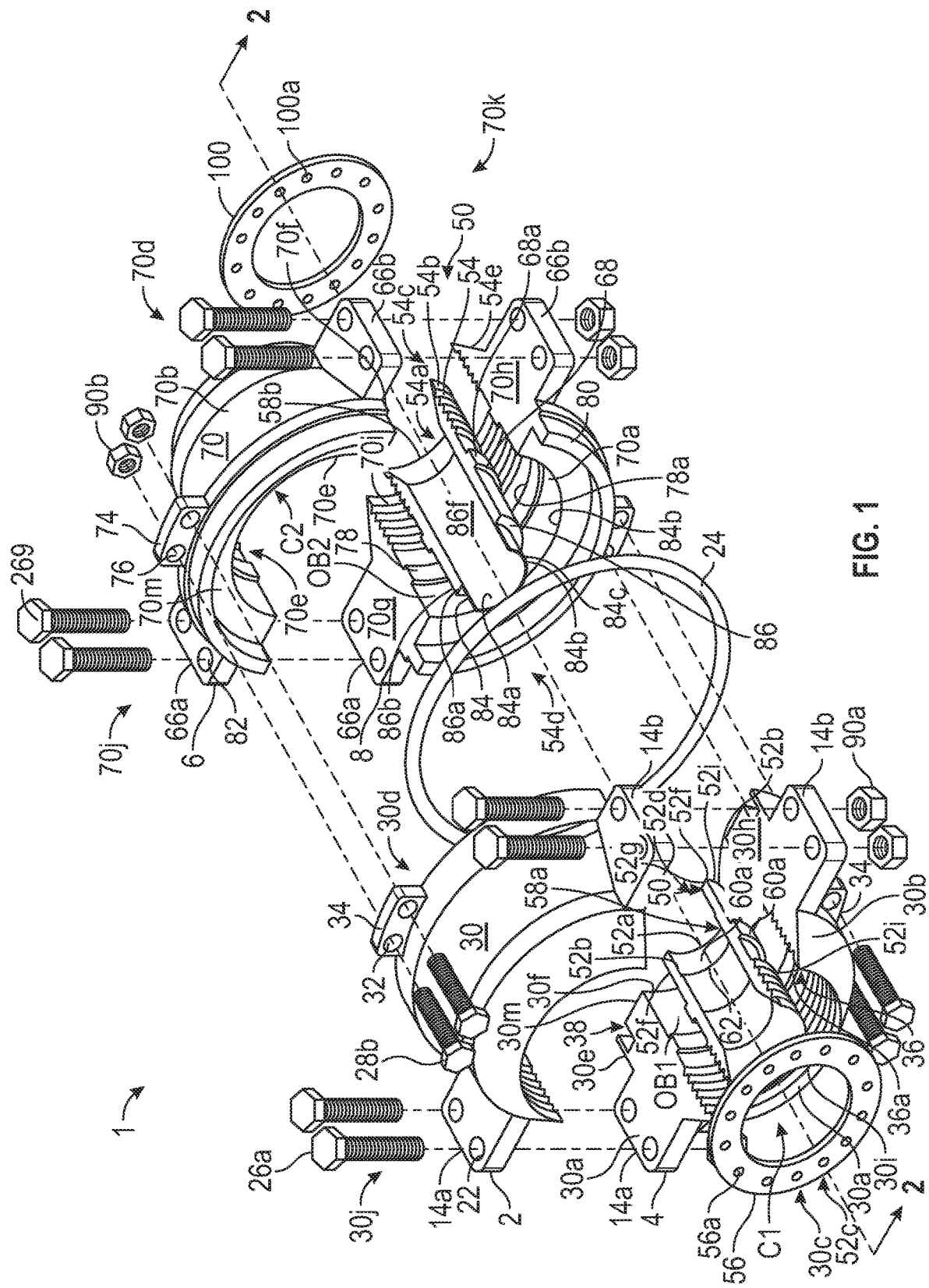
FIG. 1 is an isometric exploded view of an example of a pipe coupling connector, according to one embodiment of the present invention, shown in a preassembled state.

Embodiments of the present disclosure relate generally to connectors used for connecting segments of flexible pipe to one another, another pipe, an end connection, or another fluid transfer node. Embodiments of the present disclosure will be described below with reference to the figures. In one aspect, embodiments disclosed herein generally relate to an apparatus for connecting pipes and pipelines. In other aspects, embodiments disclosed herein relate to a method of assembling the apparatus for connecting pipes.

As used herein, the term "coupled" or "coupled to" can indicate establishing either a direct or indirect connection, and is not limited to either unless expressly referenced as such. The term "set" can refer to one or more items. Wherever possible, like or identical reference numerals are used in the figures to identify common, similar or the same elements. The figures are not necessarily to scale and certain features and certain views of the figures can be shown exaggerated in scale for purposes of clarification. Each figure should be viewed in conjunction with the written description.

Figure 2:
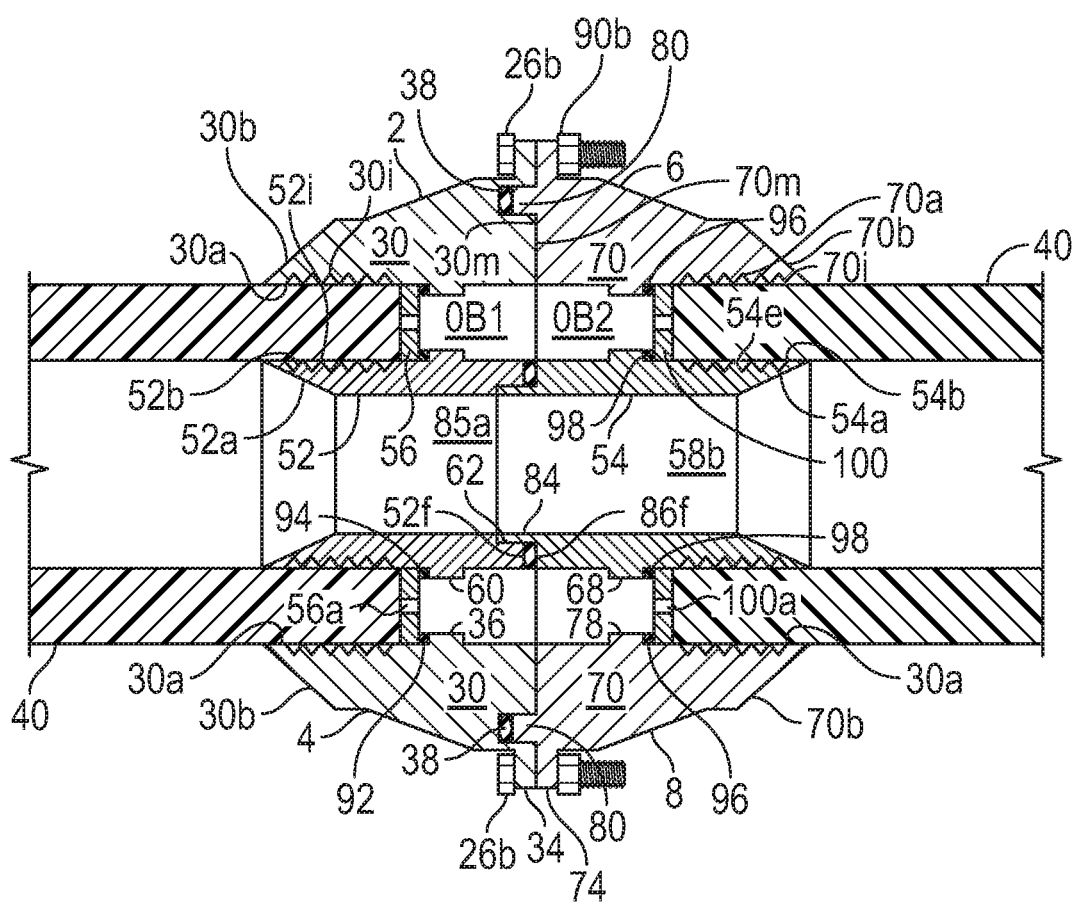
FIG. 2 is a longitudinal sectional view taken at line 2-2 of FIG. 3.

Referring to FIGS. 1 and 2, an isometric view and a cross-sectional view of a compression coupling fitting that includes a pipe connector 1 according to one or more embodiments of the present invention are shown. Pipe, as understood by those of ordinary skill, can be a tube to convey or transfer any water, gas, oil, or any type of fluid known to those skilled in the art. Pipelines can run onshore and/or through shallow water and extend long distances, such as tens, hundreds or thousands of miles, either above ground or buried a few feet underground (e.g., ranging from about 3 feet to about 6 feet). Bodies of shallow water can include, for example, rivers, lakes or other bodies of water having depths ranging up to 50 meters, up to 100 meters, or up to 150 meters. In yet other embodiments, pipelines can run offshore, for example through depths of greater than 150 meters, such as greater than 500 meters or greater than 1,000 meters.

Figure 3:
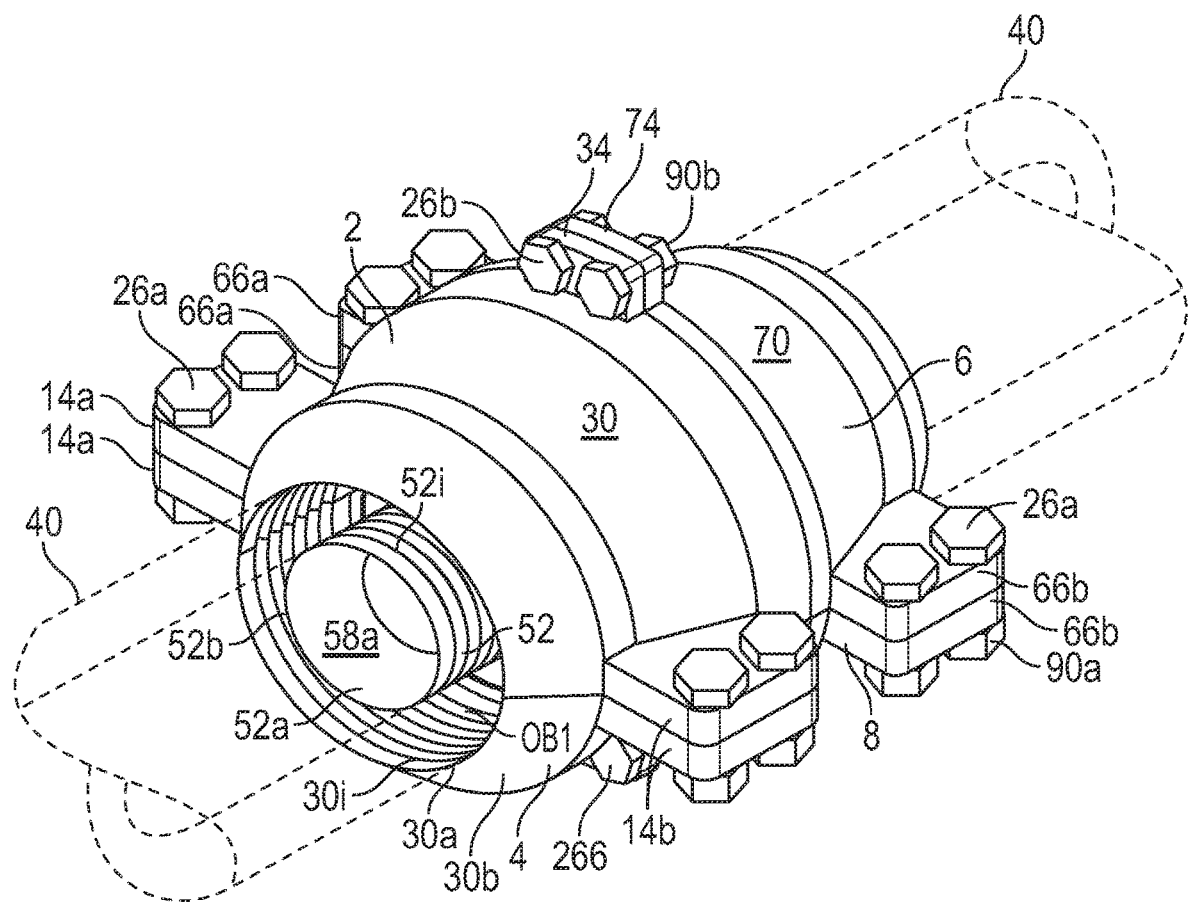
FIG. 3 is an isometric view of an example of a pipe coupling connector, according to one embodiment of the present invention, shown in an assembled state.

Methods according to embodiments of the present disclosure can include providing a length of pipe that can be used for transporting fluids or gas. The pipe can include a housing defining a central bore extending the length of the pipe, through which transported fluids can be pumped. The housing can further have an annulus formed between the thickness of the housing that can form a conduit in one or more embodiments of the present invention. As referred to herein, conduits formed or disposed "between" or "within" the thickness of a housing are conduits that are not exposed to the inner or outermost surface of the housing, but rather, are covered or beneath the inner and outermost surfaces of the housing. For example, as shown in FIGS. 2 and 3, a pipe 40 can include a conduit 40*a* that includes a space in which, for example, air or another gas or liquid is flowed therethrough, or trapped or held therein. Further, the pipeline can include many pipe segments that are connected together with pipe joints and/or connectors, including connectors described in one or more embodiments of the present invention, where the pipe segments, pipe joints and/or connectors are alternatingly connected in an end-to-end configuration.

The pipe 40 can be made of any type of materials including without limitation plastics, metals, a combination thereof, composites (e.g., fiber reinforced composites), or other materials known in the art. One type of pipe 40 is flexible pipe, which is used frequently in many applications, including without limitation, both onshore and offshore oil and gas applications.

Flexible pipe, or also referred to as spoolable pipe, can include Bonded or Unbonded Flexible Pipe, Flexible Composite Pipe (FCP), Thermoplastic Composite Pipe (TCP), or Reinforced Thermoplastic Pipe (RTP). FCP or RTP pipe can itself be generally composed of several layers. In one or more embodiments, a flexible pipe can include a thermoplastic liner or internal pressure sheath having a reinforcement layer and a thermoplastic outer cover layer. In one or more embodiments, the thermoplastic may be high-density polyethylene (HDPE). Thus, flexible pipe can include different layers that can be made of a variety of materials and also may provide corrosion resistance. For example, in one or more embodiments, the pipe can have a corrosion protection outer cover layer that is disposed over another layer of steel reinforcement. In this embodiment, helically wound steel strips can be placed over a liner made of thermoplastic pipe. Flexible pipe can be designed to handle a variety of pressures, temperatures, and conveyed fluids. Further, flexible pipe can offer unique features and benefits versus steel/carbon steel pipe lines in the area of corrosion resistance, flexibility, installation speed and re-usability. Another type of flexible or spoolable pipe is coiled tubing, which can be made of steel and have a corrosion protection shield layer.

In one or more embodiments, the pipe connector 1 generally includes pipe connector compression segments 2 and 4, that can be extricably and interlockingly connected to one another via vertical compression bolts 26*a* engaging side flanges disposed on and integrally formed with each of the connector segments 2 and 4, and pipe connector compression segments 6 and 8 that similarly can be extricably and interlockingly connected to one another via vertical compression bolts 26*a* engaging side flanges disposed on and integrally formed with each of the connector segments 6 and 8. As disclosed herein, once the connector segments 2 and 4 are connected to one another and the connector segments 6 and 8 are connected to one another, the connected segments 2,4 and connected segments 6,8 can also be extricably and interlockingly connected to one another via horizontal compression bolts 26*b* engaging top and bottom flanges, disposed on the top and bottom sides of and integrally formed with the connector segments 2 and 4 and the connector segments 6 and 8, respectively, and a tongue and groove connection that is disclosed herein with respect to FIGS. 1, 2 and 3. In one or more embodiments, a gasket (not shown) is mounted on one or more of planar surfaces 30*g* and one or more planar surfaces 30*h* of connector segments 2 and 4 such that a mechanical fluid-tight seal is formed between the side flanges formed on connector segments 2 and 4 when the segments 2 and 4 are extricably and interlockingly connected to one another. Similarly, in one or more embodiments, a gasket (not shown) is mounted on one or more of planar surfaces 70*g* and one or more of planar surfaces 70*h* of connector segments 6 and 8 such that a mechanical fluid-tight seal is formed between the side flanges formed on connector segments 6 and 8 when the segments 6 and 8 are extricably and interlockingly connected to one another. In these embodiments, the gasket is configured to operate and perform in the environment (e.g., temperature range, pressure range, and/or chemical exposure) in which the specific embodiment of the pipe connector is being utilized. In one or more embodiments, the gasket can take the form of or include an O-ring, a coupling, a sleeve or some other fluid-tight seal that works for its intended purpose.

Each of the connector segments 2, 4, 6 and 8 can be formed of stainless steel, carbon steel, malleable iron, ductile iron, or a combination of other suitable metals. For example, each of the connector segments 2, 4, 6 and 8 can be formed of ductile iron conforming to ASTM A536, Grade 65-45-12, or ductile iron conforming to ASTM A395, Grade 65-45-15. In these or other embodiments of the present invention, the connector segments 2 and 4 can be coated, hot-dipped galvanized, or coated with another suitable material using a process that protects each of the connector segments. Each of the bolts 26 can be formed of stainless steel, carbon steel, iron or some other suitable material. For example, the bolts 26 are formed of carbon steel meeting the mechanical property requirements of ASTM A449 (imperial), or carbon steel meeting the mechanical property requirements of ASTM A563 Grade B. In other embodiments, track bolts and heavy hex nuts that are zinc electroplated per ASTM B633 ZN/FE5, finish Type III (imperial size) or Type II (metric size), are utilized. In other embodiments, the bolts 26*a* and 26*b* are formed of stainless steel meeting the mechanical property requirements of ASTM F593, Group 2 (316 stainless steel), condition CW. In other embodiments, the nuts 90*a* and 90*b* are formed of stainless steel, meeting the mechanical property requirements of ASTM F594, Group 2 (316 stainless steel), condition CW, with galling reducing coating. In other embodiments, the connector segments 2, 4, 6 and 8 can be formed of high-density plastic or plastic composites. For example, in one or more embodiments, the connector segments 2, 4, 6 and 8 are formed of high-density polyethylene (HDPE) and/or high-density polyethylene of raised temperature (PE-RT).

According to one or more embodiments of the present invention, the pipe connector 1 engages the flexible pipe segments 40 to compress the connector segments 2, 4, 6 and 8 against the pipe segments to creates interlocking and fluid-tight connections between the pipe segments such that fluids disposed or trapped within the annulus of pipeline segments 40 are kept separate and apart from the fluids transported within the inner diameter of pipeline segments 40 as the fluids traverse the central bore 58 formed within an inner compression connector 50 and the outer bores formed within the connected segments 2 and 4 and the connected segments 6 and 8, as disclosed herein. The inner compression connector 50 provides the pipe connector 1 the advantage of providing a pathway through the pipe connector 1 through which fluids, such as trapped gasses and liquids or other fluids disposed within the annulus of a pipeline or pipe segment, can flow such that the liquids disposed in the annulus of the pipe can be ejected in a controlled manner. This configuration provides protection to the pipeline and provides for the integrity of the transported hydrocarbons and other fluids within the pipeline. The pipe connector 1 also provides stability to a flexible pipeline as the components of the pipe connector 1 are made of solid and durable materials that one having skill in the art will appreciate are proven to perform under conditions and within environments wherein flexible pipelines are used to transport hydrocarbons. Utilizing one or more pipe connectors disclosed in one or more embodiments within a pipeline protects against unwanted deformation and lends reliability to the pipelines structure as shorter pipe segments 40 can be utilized in the pipeline as the pipe connectors provide fluid-tight couplings between the pipeline segments. Other advantages are known and will be made clear to persons having skill in the art pursuant to the disclosure herein.

One or more embodiments of the connector segments 2 and 4 will now be described with reference to FIGS. 1 and 2. Each of the connector segments 2 and 4 generally include a middle section 30, peripheral side flanges 14a and 14b, and a peripheral middle flange 34, respectively. As illustrated in FIGS. 1 and 2, the middle section 30 included in each of the connector segments 2 and 4 includes an inner surface 30a, an outer surface 30b, a first side 30c, a second side 30d, a third side 30j, a fourth side 30k, and planar surfaces 30g and 30h that extend between the inner surface 30a and the outer surface 30b. The middle section 30 includes side walls 30e that are formed in the outer surface 30b and border the planar surfaces 30g and 30h. The middle section 30 also includes side walls 30f that are formed in the inner surface 30a and border the planar surfaces 30g and 30h. A planar surface 30m, that extends in a radial direction that is generally perpendicular to the inner surface 30a and extends in a circumferential direction and ends at planar surfaces 30g and 30h, is formed between side walls 30e and side walls 30f The outer surface 30a has a radius of curvature such that the middle section 30 will surround at least a portion of an end of a pipe segment 40. The connector segments 2 and 4 each include a middle flange 34 that is integrally formed with and extends outwardly from the outer surface 30b. Middle flanges 34 each contain a number of holes 32 through which an equal number of threaded fasteners, such as horizontal compression bolts 26b (e.g., compression bolts, screws, suitable bolt/nut assemblies, etc.), are extended for extricably and interlockingly connecting additional connector segments 6 and 8 to connector segments 2 and 4, respectively, as disclosed herein.

As shown in FIG. 1, the inner surface 30a also has a radius of curvature such that a cavity C1, that is configured to surround at least a portion of an end of a pipe segment 40, is formed. A series of serrated edges 30i are formed in the inner surface 30a and extend a distance into the cavity C1 formed by inner surface 30a. As one having ordinary skill will appreciate, the dimensions of the connectors segments 2 and 4, and the distance in which the series of serrated edges 30i extend into the cavity cavity C1 can vary in one or more embodiments of the present invention depending upon the dimensions of the pipe segments that will be coupled to one another utilizing one or more embodiments. As shown in FIG. 1, a ledge 36 is formed on the inner surface 30a. The ledge 36 extends in a circumferential direction around the entire cavity C1 and ends at both sides thereof at the planar surfaces 30g and 30h. In one or more embodiments, the ledge 36 further includes a height to define a circumferential face 36a that extends in a radial direction that is generally perpendicular to the cavity C1 and faces the first side 30c of connector segments 2 and 4. The ledge 36 is positioned within cavity C1 at a depth that is suitable to engage an end of the pipe segment 40, when the pipe segment 40 is inserted into the cavity C1 of inner surface 30a, and help prevent the end of the pipe segment 40 from advancing past the ledge 36 further into the cavity C1.

In one or more embodiments, a vent assurance ring 56 is disposed on the circumferential face 36a of connector segments 2 and 4, as illustrated in FIG. 1. The vent assurance ring 56 is configured as a solid disk that includes premachined holes 56a that extend through one face of the disk to the other face of the disk such that gasses and other liquids that are disposed within the annulus of the pipe segments 40 can pass through the vent assurance ring 56 via the holes. The vent assurance ring 56 is configured to seat against the circumferential face 36a of the ledge 36 formed on the inner surface 30a of connector segments 2 and 4, and extend in an axial direction such that, when the connector segments 2 and 4 are interlockingly connected to one another, the vent assurance ring 56 also seats against the circumferential face 60a of ledge 60 formed on the outer surface of inner compression connector 52, as discussed herein. As one having skill in the art appreciates with the benefit of the teachings provided herein, when the connectors segments 2 and 4 are interlockingly connected to one another to engage the end of a pipe segment 40, the vent assurance ring 56 is configured such that the end of the pipe segment 40 abuts the vent assurance ring 56. Thus, the vent assurance ring 56 allows for the annular communication of gasses and other fluids through the pipe connector 1. In one or more embodiments, the vent assurance ring is manufactured from stainless steel. In other embodiments, the vent assurance is manufactured from a hard density plastic material. In one or more embodiments, the vent assurance ring is ⅛ of an inch thick in the axial direction. One having skill in the art with the benefit of the teachings herein will appreciate that other dimensions and configurations of the vent assurance ring can be utilized in one or more other embodiments. One having skill in the art with the benefit of the teachings herein will appreciate that although the holes 56a are illustrated as being of a specific number, of a specific shape (e.g., round), and disposed at a specific distance away from one another, a different number of holes, holes of different shapes and sizes, and holes spaced further or nearer apart to one another can be utilized to effect the intended purposes of the holes 56a.

In one or more embodiments other embodiments, a gasket 92, shown in FIG. 2, can be mounted on the circumferential face 36a such that a mechanical fluid-tight seal is formed between the vent assurance ring 56 and the ledge 36 when the vent assurance ring 56 is seated on the gasket 92. Similarly, a gasket 94 can be mounted on circumferential face 60a of ledge 60 such that a mechanical fluid-tight seal is formed between the vent assurance ring 56 and the ledge 36 when the vent assurance ring 56 is seated on the gasket 94. In these embodiments, the gaskets 92 and 94 are configured to operate and perform in the environment (e.g., temperature range, pressure range, and/or chemical exposure) in which the specific embodiment of the pipe connector is being utilized. In one or more embodiments, the gaskets 92 and 94 can take the form of or include an O-ring, a coupling, a sleeve or some other fluid-tight seal that works for its intended purpose.

The series of serrated edges 30i similarly extend in a circumferential direction around the entire cavity C1 and end at both sides thereof at the planar surfaces 30g and 30h. In one or more embodiments, the ledge 36 can include different configurations than what is illustrated in FIG. 1. For example, in one or more embodiments, the ledge 36 extends in a circumferential direction partially around the cavity C1. In other embodiments, a series of ledges 36 extend in a circumferential direction partially around the cavity C1. In one or more embodiments, the series of serrated edges 30*i* can include different configurations than what is illustrated in FIG. 1. For example, in one or more embodiments, the series of serrated edges 30*i* extends in a circumferential direction partially around the cavity C1. In other embodiments, a plurality of series of serrated edges 30*i* extend in a circumferential direction partially around the cavity C1.

For each of the connector segments 2 and 4, the middle section 30 also includes a peripheral groove 38, formed on the second side 30*d* of the middle section 30 between side walls 30*e* and 30*f*, that extends a depth within planar surface 30*m*, and extends in a circumferential direction around the cavity C1 and ends at both sides thereof at the planar surfaces 30*g* and 30*h*. The peripheral groove 38 formed in connector segments 2 and 4 is configured to sealingly mate with a peripheral extension 80 formed in opposing pipe connector segments 6 and 8, respectively, as disclosed herein for forming a fluid-tight seal. In one or more embodiments, a gasket 24 is disposed within the groove 38 and seated on the floor of groove 38 disposed at a depth within planar surface 30*m*. The gasket 24 is configured to assist in forming a fluid-tight seal between the connected pipe connectors segments 2,4 and the connected pipe connectors segments 6,8 when the peripheral extension 80 of segments 6 and 8 engages the groove 38 of connector segments 2 and 4. One having ordinary skill in the art will appreciate that the gasket 24 is configured to operate and perform in the environment (e.g., temperature range, pressure range, and/or chemical exposure) in which the specific embodiment of the pipe connector is being utilized. In one or more embodiments, the gasket 24 can take the form of or include an O-ring, a coupling, a sleeve or some other fluid-tight seal that works for its intended purpose. In one or more embodiments, the inner surface 30*a* of the first side 30*c* is tapered outwardly to assist the end of a pipe 40 during insertion of the pipe 40 into the cavity C1 defined by the inner surface 30*a* of the connector segments 2 and 4.

As shown in FIGS. 1 and 2 with respect to connector segments 2 and 4, peripheral side flanges 14*a* and 14*b* are integrally formed with and extend in an outwardly direction from the third side 30*j* and the fourth side 30*k*, respectively, of the middle section 30. A number of holes 22 through which an equal number of threaded fasteners, such as vertical compression bolts 26*a* (e.g., compression bolts, screws, suitable bolt/nut assemblies, etc.), are extended are formed in peripheral flanges 14*a* and 14*b* for extricably and interlockingly connecting the segment 2 to the segment 4. In one or more embodiments, as is seen for example with respect to FIGS. 1 and 2, two holes 22 are formed in each flange 14*a* and 14*b*. In other embodiments, 1, 3, 4, 5 or another number of holes are formed in each flange 14*a* and 14*b*, depending upon the dimensions of the flange, the size of the circumferential size of the pipe 40, the pressure of the fluid being transported within the pipe 40, and the required specifications of the connection formed via the pipe connector 1.

One or more embodiments of the pipe connector segments 6 and 8 will now be described with reference to FIGS. 1 and 2. Each of the segments 6 and 8 generally include a middle section 70, peripheral side flanges 66*a* and 66*b*, and a middle flange 74, respectively. As shown in FIGS. 1 and 2, the middle section 70 included in each of the segments 6 and 8 includes an inner surface 70*a*, an outer surface 70*b*, a first side 70*c*, a second side 70*d*, a third side 70*j*, a fourth side 70*k*, and planar surfaces 70*g* and 70*h* that extend between the inner surface 70*a* and the outer surface 70*b*. The middle section 70 includes side walls 70*e* that are formed in the outer surface 70*b* and border the planar surfaces 70*g* and 70*h*. The middle section 70 also includes side walls 70*f* that are formed in the inner surface 70*a* and border the planar surfaces 70*g* and 70*h*. A planar surface 70*m*, that extends in a radial direction that is generally perpendicular to the inner surface 70*a* and extends in a circumferential direction and ends at planar surfaces 70*g* and 70*h*, is formed between side walls 70*e* and side walls 70*f*. The outer surface 70*a* has a radius of curvature such that the middle section 70 will surround at least a portion of an end of a pipe segment 40. The connector segments 6 and 8 each include a middle flange 74 that is integrally formed with and extends outwardly from the outer surface 70*b*.

Middle flanges 74 each contain a number of holes 76 through which an equal number of threaded fasteners, such as horizontal compression bolts 26*b* (e.g., compression bolts, screws, suitable bolt/nut assemblies, etc.), are extended for extricably and interlockingly connecting connector segments 6 and 8 to connector segments 2 and 4, respectively, as disclosed herein.

As shown in FIG. 1, the inner surface 70*a* also has a radius of curvature such that a cavity C2, that is configured to surround at least a portion of an end of a pipe segment 40, is formed. A series of serrated edges 70*i* are formed in the inner surface 70*a* and extend a suitable distance into the cavity C2 formed by inner surface 70*a*. As shown in FIG. 1, a ledge 78 is formed on the inner surface 70*a*. The ledge 78 extends in a circumferential direction around the entire cavity C2 and ends at both sides thereof at the planar surfaces 70*g* and 70*h*. In one or more embodiments, the ledge 78 further includes a height to define a circumferential face 78*a* that extends in a radial direction that is generally perpendicular to the cavity C2 and faces the second side 70*d* of connector segments 6 and 8. The ledge 78 is positioned within cavity C2 at a depth that is suitable to engage an end of the pipe segment 40, when the pipe segment 40 is inserted into the cavity C2 of inner surface 70*a*, and help prevent the end of the pipe segment 40 from advancing past the ledge 78 further into the cavity C2.

In one or more embodiments, a vent assurance ring 100 is disposed on the circumferential face 78*a* of connector segments 6 and 8, as illustrated in FIG. 1. Similar to the vent assurance ring 56, the vent assurance ring 100 is configured as a solid disk that includes pre-machined holes 100*a* that extend through one face of the disk to the other face of the disk such that gasses and other liquids that are disposed within the annulus of the pipe segments 40 can pass through the vent assurance ring 100 via the holes. The vent assurance ring 100 is configured to seat against the circumferential face 78*a* of the ledge 78 formed on the inner surface 70*a* of connector segments 6 and 8, and extend in an axial direction such that, when the connector segments 6 and 8 are interlockingly connected to one another, the vent assurance ring 96 also seats against the circumferential face 68*a* of ledge 68 formed on the outer surface 54*b* of inner compression connector 54, as discussed herein. As one having skill in the art appreciates with the benefit of the teachings provided herein, when the connectors segments 6 and 8 are interlockingly connected to one another to engage the end of a pipe segment 40, the vent assurance ring 100 is configured such that the end of the pipe segment 40 abuts the vent assurance ring 100. Thus, the vent assurance ring 100 allows for the annular communication of gasses and other fluids through the pipe connector 1. In one or more embodiments, the vent assurance ring is manufactured from stainless steel. In other embodiments, the vent assurance is manufactured from a hard density plastic material. In one or more embodiments, the vent assurance ring is ⅛ of an inch thick in the axial direction. One having skill in the art with the benefit of the teachings herein will appreciate that other dimensions and configurations of the vent assurance ring can be utilized in one or more other embodiments. One having skill in the art with the benefit of the teachings herein will appreciate that although the holes 100a are illustrated as being of a specific number, of a specific shape (e.g., round), and disposed at a specific distance away from one another, a different number of holes, holes of different shapes and sizes, and holes spaced further or nearer apart to one another can be utilized to effect the intended purposes of the holes 100a.

In one or more embodiments other embodiments, a gasket 96, shown in FIG. 2, can be mounted on the circumferential face 78a such that a mechanical fluid-tight seal is formed between the vent assurance ring 100 and the ledge 78 when the vent assurance ring 100 is seated on the gasket. Similarly, a gasket 98 can be mounted on circumferential face 68a of ledge 68 such that a mechanical fluid-tight seal is formed between the vent assurance ring 100 and the ledge 68 when the vent assurance ring 100 is seated on the gasket 98. In these embodiments, the gaskets 96 and 98 are configured to operate and perform in the environment (e.g., temperature range, pressure range, and/or chemical exposure) in which the specific embodiment of the pipe connector is being utilized. In one or more embodiments, the gaskets 96 and 98 can take the form of or include an O-ring, a coupling, a sleeve or some other fluid-tight seal that works for its intended purpose.

The series of serrated edges 70i similarly extend in a circumferential direction around the entire cavity C2 and end at both sides thereof at the planar surfaces 70g and 70h. In one or more embodiments, the ledge 36 can include different configurations than what is illustrated in FIG. 1. For example, in one or more embodiments, the ledge 78 extends in a circumferential direction partially around the cavity C2. In other embodiments, a series of ledges 78 extend in a circumferential direction partially around the cavity C2. In one or more embodiments, the series of serrated edges 70i can include different configurations than what is illustrated in FIG. 1. For example, in one or more embodiments, the series of serrated edges 70i extends in a circumferential direction partially around the cavity C2. In other embodiments, a plurality of series of serrated edges 70i extend in a circumferential direction partially around the cavity C2.

For each of the connector segments 6 and 8, the middle section 70 also includes a peripheral extension 80, formed on the first side 70c of the middle section 70 between side walls 70e and 70f, that is integrally formed with and extends in an outwardly direction from the planar surface 70m. The peripheral extension 80 also extends in a circumferential direction around the cavity C2 and ends at both sides thereof at the planar surfaces 70g and 70h. The peripheral extensions 80 formed on connector segments 6 and 8 are configured to extend into the peripheral grooves 38 formed within connector segments 2 and 4 to sealingly connect the connectors segments 6 and 8 to opposing pipe connector segments 2 and 4, respectively, and form a fluid-tight seal between the connected segments 2 and 4 and the connected segments 6 and 8, as disclosed herein. In one or more embodiments, the inner surface 70a of the second side 70d is tapered outwardly to assist the end of a pipe 40 during insertion of the pipe 40 into the cavity C2 defined by the inner surface 70a of the connector segments 6 and 8.

As shown in FIGS. 1 and 2, peripheral side flanges 66a and 66b are integrally formed with and extend in an outwardly direction from the third side 70j and the fourth side 70k, respectively, of the middle section 70. A number of holes 82 through which an equal number of threaded fasteners, such as vertical compression bolts 26a (e.g., compression bolts, screws, suitable bolt/nut assemblies, etc.), are extended are formed in peripheral flanges 66a and 66b for extricably and interlockingly connecting the segment 6 to the segment 8. In one or more embodiments, as is seen for example with respect to FIGS. 1 and 2, two holes 82 are formed in each flange 66a and 66b. In other embodiments, 1, 3, 4, 5 or another number of holes are formed in each flange 66a and 66b, depending upon the dimensions of the flange, the size of the circumferential size of the pipe 40, the pressure of the fluid being transported within the pipe 40, and the required specifications of the connection formed via the pipe connector 1.

Pipe connector 1 also includes an inner compression connector 50. In one or more embodiments, as shown with respect to FIGS. 1 and 2, the inner compression connector 50 includes separate substantially cylindrical first and second components 52 and 54, respectively, that are connected to one another when the pipe connector segments 2 and 4 are extricably and interlockingly connected to pipe connector segments 6 and 8 to form the pipe connector 1. In one or more other embodiments, the inner compression connector 50 is a single substantially cylindrical component that is permanently connected to one of the segments 2, 4, 6 or 8. In one or more additional embodiments, the inner compression connector 50 is a separate substantially cylindrical component that is inserted within the inner diameter at the ends of two pipeline segments 40 before the end of a pipe 40 is inserted into the cavity C1 of the pipe connector segments 2 and 4 and the end of another pipe 40 is inserted into the cavity C2 of the pipe connector segments 6 and 8 to connect the two pipe segments together, as is discussed in more detail herein. As one having ordinary skill will appreciate, the inner compression connector 50 can be made from the same material or combination of materials and manufactured in a similar manner as the connector segments 2, 4, 6 and 8, as disclosed herein.

Referring now to FIG. 1 of the drawings, one or more embodiments of the inner compression connector 50 will now be described. As one having ordinary skill in the art will appreciate, although the inner compression connector 50 is substantially cylindrical and configured to be inserted into the central bore of a pipe and engage the inner surface of the end of a pipe 40, an isometric view of the inner compression connector 50 components is shown wherein a portion of the inner compression connector 50 is cut away to expose the features of the inner compression connector 50 for the sake of clarity.

In one or more embodiments, inner compression connector 50 includes the first inner compression connector component 52 and the second inner compression connector component 54. First inner compression connector component 52 includes an inner surface 52a defining a central bore 58a, an outer surface 52b, a first side 52c and a second side 52d. As is shown in FIGS. 1 and 2, the inner surface 30a of connector segments 2, 4 and the outer surface 52b of first inner compression connector component 52 form an outer bore OB1 that is substantially cylindrical and extends the length of cavity C1 of connector segments 2 and 4 when connector segments 2 and 4 are connected to one another. In one or more embodiments, outer surface 52b of first inner compression connector component 52 is tapered inwardly at the first side 52c to assist the engagement of the end of a pipe 40 with the first inner compression connector component 52 during insertion of the pipe 40 into the cavity C1, defined by the inner surface 30a of the connector segments 2 and 4. A series of serrated edges 52i are formed in the outer surface 52b of first inner compression connector component 52 and extend circumferentially around the outer surface 52b and are disposed between, for example, the first side 52c of the inner compression connector component 52 and a ledge 60 formed on the outer surface 52b. In one or more embodiments, the first inner compression connector component does not include a ledge 60 such that the series of serrated edges 52i disposed along the outer surface 52b extend to a suitable point before the second end 52d of the first inner compression connector component to effect an engagement between the inner bore of a pipe segment 40 and the first inner compression connector component 52. In one or more embodiments, the first side 52c of the inner compression connector 50 is coextensive with the first side 30c of connector segments 2 and 4 such that the length of the first inner compression connector component 52 is substantially the same as the length of the connector segments 2 and 4. In other embodiments, the length of the first inner compression connector component 52 is shorter than the length of the connector segments 2 and 4 such that the first side 52c of the inner compression connector 50 is disposed within cavity C1 when connectors segments 2 and 4 are connected together. The ledge 60 of first inner compression connector component 52 is formed on the outer surface 52b between the serrated edges 52i and the second side 52d of the first inner compression connector component 52. The ledge 60 extends in a circumferential direction around the entire outer surface of the first inner compression connector component 52.

In one or more embodiments, the ledge 60 further includes a height to define a circumferential face 60a that extends in a radial direction that is generally perpendicular to the central bore 58a and faces the first side 52c of inner compression connector component 52. The ledge 60 is configured to oppose ledge 36 of connector segments 2 and 4, when connector segments 2 and 4 are connected to one another, and has a height suitable to engage an end of the pipe segment 40 and help prevent the end of the pipe segment 40 from advancing past the ledge 36 and the ledge 60 further into the outer bore OB1 when the pipe segment 40 is inserted into the outer bore OB1. In one or more embodiments, the vent assurance ring 56 is configured to engage the circumferential face 60a of the ledge such that the vent assurance ring 56 will engage the end of a pipe segment 40 when the pipe is inserted into outer bore OB1, as discussed herein. In these embodiments, the vent assurance ring 56 also assists in preventing the end of a pipe segment 40 from advancing past the ledge 36 and the ledge 60 further into the outer bore OB1.

In one or more embodiments, a gasket 94, shown in FIG. 2, similar to the gasket 92 disclosed above with respect to ledge 36, is mounted on the circumferential face 60a of ledge 60 such that a mechanical fluid-tight seal is formed between the vent assurance ring 56 and the ledge 60 when the vent assurance ring 56 is seated on the gasket. In these embodiments, the gasket is configured to operate and perform in the environment (e.g., temperature range, pressure range, and/or chemical exposure) in which the specific embodiment of the pipe connector is being utilized. In one or more embodiments, the gasket can take the form of or include an O-ring, a coupling, a sleeve or some other fluid-tight seal that works for its intended purpose. In one or more embodiments, the series of serrated edges 52i extends longitudinally along the outer surface 52b of the first inner compression connector component 52 and stops at the ledge 60. In other embodiments, the series of serrated edges 52i stops at a distance before the ledge 60.

As shown in FIGS. 1 and 2, a ledge 62 is formed on the inner surface 52a of first inner compression connector component 52 and disposed between the first side 52c and second side 52d of the first inner compression connector component 52. The ledge 62 extends circumferentially around the entire central bore 58a and has a height configured to matingly engage a front face of an edge 84c of an inner compression connector extension 84, discussed in more detail herein, included in the second inner compression connector component 54 when the components 52 and 54 are connected to sealingly and interlockingly engage one another to form a fluid-tight seal. In one or more embodiments, similar to the gasket disclosed above with respect to ledge 36, a gasket (not shown) is mounted on the ledge 62 such that a mechanical fluid-tight seal is formed between the front face of the edge 84c of the inner compression connector extension 84 when the first and second inner compression connector components 52 and 54 are connected to sealingly and interlockingly engage one another. In these embodiments, the gasket is configured to operate and perform in the environment (e.g., temperature range, pressure range, and/or chemical exposure) in which the specific embodiment of the pipe connector is being utilized. In one or more embodiments, the gasket can take the form of or include an O-ring, a coupling, a sleeve or some other fluid-tight seal that works for its intended purpose.

In one or more embodiments, inner surface 52a of first inner compression connector component 52 also includes a mating surface 52e that extends in an axial direction from the ledge 62 to the inner circumferential edge 52h and in a circumferential direction around the entire inner bore 58a of the inner compression connector component 52. The mating surface 52e is sized and configured to form a press fit between the mating surface 52e and the outer surface 84b of the inner compression connector extension 84 included in the second inner compression connector component 54 when the first and second inner compression connector components 52 and 54 are connected to one another. The first inner compression connector component 52 includes an outer circumferential edge 52g and an inner circumferential edge 52h disposed on the second side 52d. In one or more embodiments, a circumferential face 52f that has a width 52t is formed between the outer circumferential edge 52g and an inner circumferential edge 52h and extends is a radial direction that is generally perpendicular to the central bore 58a. In one or more embodiments, the circumferential face 52f of the first inner compression connector component 52 is configured to engage an opposing circumferential face 86f of the second inner compression connector component when the first and second inner compression connector components 52 and 54 are matingly connected to one another. In one or more embodiments, a gasket (not shown) is disposed on the circumferential face 52f of first inner compression connector component 52 such that a mechanical fluid-tight seal is formed between the first and second inner compression connector components 52 and 54 when the components 52 and 54 are matingly connected to one another. In other embodiments, a gasket (not shown) is disposed on the circumferential face 86f of second inner compression connector component 54 to form a mechanical fluid-tight seal between the first and second inner compression connector components 52 and 54.

In one or more embodiments, inner compression connector 50 includes a second inner compression connector component 54. As shown in FIG. 1, second inner compression connector component 54 includes an inner surface 54*a* defining a central bore 58*b*, an outer surface 54*b*, a first side 54*c* and a second side 54*d*. As is shown in FIGS. 1 and 2, the inner surface 70*a* of connector segments 6, 8 and the outer surface 54*b* of second inner compression connector component 54 form an outer bore OB2 that is substantially cylindrical and extends the length of cavity C2 of connector segments 6 and 8 when connector segments 6 and 8 are connected to one another. In one or more embodiments, outer surface 54*b* of second inner compression connector component 54 is tapered inwardly at the first side 54*c* to assist the engagement of the end of a pipe 40 with the second inner compression connector component 54 during insertion of the pipe 40 into the cavity C2, defined by the inner surface 70*a* of the connector segments 6 and 8. A series of serrated edges 54*e* are formed in the outer surface 54*b* of second inner compression connector component 54. The serrated edges 54*e* extend circumferentially around the outer surface 54*b*, and are disposed between the second side 54*d* of the inner compression connector component 54 and a ledge 68 formed on the outer surface 54*b*. In one or more embodiments, the second inner compression connector component 54 does not include a ledge 68 such that the series of serrated edges 54*e* will extend along the outer surface 54*b* to a suitable point before the first end 54*c* of the second inner compression connector component 54 to effect an engagement between the inner bore of a pipe segment 40 and the second inner compression connector component 54. In one or more embodiments, the second side 54*d* of the second inner compression connector component 54 is coextensive with the second side 70*d* of connector segments 6 and 8 such that the length of the second inner compression connector component 54 is substantially the same as the length of the connector segments 6 and 8. In other embodiments, the length of the second inner compression connector component 54 is shorter than the length of the connector segments 6 and 8 such that the second side 54*d* of the inner compression connector component 54 is disposed within cavity C2 when the connectors segments 6 and 8 are connected together.

As shown in FIGS. 1 and 2, the ledge 68 is formed on the outer surface 54*b* between the series of serrated edges 54*e* and the first side 54*c* of the inner compression connector component 54. The ledge 68 extends in a circumferential direction around the entire outer surface of the second inner compression connector component 54 and in a longitudinal direction to the first side 54*c* of the inner compression connector component 54 to define an outer circumferential edge 86*b*. The inner surface of the second inner compression connector component 54 also extends to the first side 54*c* of the second inner compression connector component 54 to define an inner circumferential edge 86*a*. A substantially planar circumferential face 86*f* is defined on the first side 54*c* of the second inner compression connector component 54 between the inner circumferential edge 86*a* and the outer circumferential edge 86*b*.

In one or more embodiments, the ledge 68 further includes a height to define a circumferential face 68*a* that extends in a radial direction that is generally perpendicular to the central bore 58*b* and faces the second side 54*d* of inner compression connector component 54. The ledge 68 of second inner compression connector component 54 is configured to oppose ledge 78 of connector segments 6 and 8 and has a height suitable to engage an end of the pipe segment 40 and help prevent the end of the pipe segment 40 from advancing past the ledge 78 and the ledge 68 further into the outer bore OB2 when the pipe segment 40 is inserted into the outer bore OB2. In one or more embodiments, the vent assurance ring 100 is configured to engage the circumferential face 68*a* of the ledge 68 such that the vent assurance ring 100 will engage the end of a pipe segment 40 when the pipe is inserted into outer bore OB2, as discussed herein. In these embodiments, the vent assurance ring 100 also assists in preventing the end of a pipe segment 40 from advancing past the ledge 78 and the ledge 68 further into the outer bore OB2.

In one or more embodiments, similar to the gasket 94 disclosed above with respect to ledge 60, a gasket 98, shown in FIG. 2, is mounted on the circumferential face 68*a* of the ledge 68 such that a mechanical fluid-tight seal is formed between the vent assurance ring 100 and ledge 68 of second inner compression connector component 54. In one or more embodiments, the series of serrated edges 54*e* formed in the outer surface 54*b* of second inner compression connector component 54 stops at the ledge 68. In other embodiments, the series of serrated edges 54*e* stops at a distance before the ledge 68.

As shown in FIGS. 1 and 2, the second inner compression connector component 54, in one or more embodiments, includes a generally cylindrical extension connector 84. In these one or more embodiments, the cylindrical extension connector 84 is integrally formed with the second inner compression connector component 54 and extends from the inner circumferential edge 86*a* of circumferential edge 86. The extension connector 84 further includes a length, an inner surface 84*a*, an outer surface 84*b*, and an edge 84*c* formed between the inner surface 84*a* and the outer surface 84*b*. As shown in FIGS. 1 and 2, the connector extension 84 is configured such that, when the first inner compression connector component 52 is matingly connected to the second inner compression connector component 54, the outer surface 84*b* of connector extension 84 engages the mating surface 52*e* of the first inner compression connector component 52, and the edge 84*c* of the connector extension 84 engages the circumferential face 52*f* of ledge 62 of the first inner compression connector component 52. In one or more embodiments, a press fit between the first and second inner compression connector components 52 and 54 is formed. For example, when the first inner compression connector component 52 is matingly connected to the second inner compression connector component 54, the outer surface 84*b* of connector extension 84 engages the mating surface 52*e* of the first inner compression connector component 52, and the edge 84*c* of the connector extension engages the ledge 62 to effect the press fit. In these embodiments, the circumferential face 52*f* of the first inner compression connector component 52 also engages the circumferential face 86*f* of the second inner compression connector component to form a fluid-tight seal therebetween. Those having skill in the art will appreciate that other connections between the first and second inner compression connector components 52 and 54 can be effected for the intended purpose disclosed herein. As one having skill in the art will appreciate, in one or more embodiments wherein the inner compression connector 50 is a single component, the cylindrical extension connector 84 will not be included in the inner compression connector 50 such that the inner surface 84*b* will be continuous and generally cylindrical.

Assembly and operation of one or more embodiments of the pipe connector is described herein with reference to FIGS. 1, 2 and 3. As is shown in FIG. 1, connector segments 2 and 4, and 6 and 8 are separated from one another such that the pipe connector 1 is preassembled before the segments 2 and 4, and 6 and 8 are connected to one another to effect the pipe connector 1 to secure two ends of pipe segments 40 together. As shown in FIG. 3, connector segment 2 is to be extricably and interlockingly connected to connector segment 4. As shown in FIGS. 1, 2 and 3, connector segment 2 is connected to segment 4 as the holes 22, formed in the side flanges 14a and 14b included in the connector segments 2 and 4, are aligned and vertical compression bolts 26a are inserted through the holes 22 and tightened to thereby draw the connector segments 2 and 4 towards one another to effect a fluid-tight connection. In one or more embodiments, a gasket, as described herein, is disposed on one or both planar surfaces 30g of connector segments 2 and 4, and one or both planar surfaces 30h of connectors segments 2 and 4. In these embodiments, once the connector segment 2 is properly seated on connector segment 4 and the vertical compression bolts 26a are tightened to effect the connection therebetween, the connector segments 2 and 4 will form a fluid-tight connection therebetween wherein connector segments 2 and 4 are positioned within a spaced relation to one another due to the positioning of the gaskets.

As shown in FIG. 3, similar to the connector segments 2 and 4, connector segment 6 is to be extricably and interlockingly connected to connector segment 8. As shown in FIGS. 1, 2 and 3, connector segment 6 is connected to segment 8 as the holes 22, formed in the side flanges 66a and 66b included in the connector segments 6 and 8, are aligned and vertical compression bolts 26a are inserted through the holes 82 and tightened to thereby draw the segments 6 and 8 towards one another to effect a fluid-tight the connection. In one or more embodiments, a gasket, as described herein, is disposed on one or both planar surfaces 70g of connector segments 6 and 8, and one or both planar surfaces 70h of connectors segments 6 and 8. In these embodiments, once the connector segment 6 is properly seated on connector segment 8 and the vertical bolts 26a are tightened to effect the connection therebetween, the connector segments 6 and 8 will form a fluid-tight connection therebetween wherein connector segments 6 and 8 are positioned within a spaced relation to one another due to the positioning of the gaskets.

As shown in FIG. 2, one or more embodiments includes the pipe connector 1 wherein the inner compression connector 50 includes first inner compression connector component 52 and second inner compression connector component 54. In one or more embodiments, the first inner compression connector component 52 is attached to connector segment 4 such that when the connector segment 2 is properly seated against connector segment 4 such that the holes 22 formed in side flanges 14a and 14b included in connector segments 2 and 4 properly align with one another, the outer bore OB1 is formed between the outer surface 52b of inner compression connector component 52 and the inner surface 30a of middle sections 30 included in connector segments 2 and 4. With reference to FIGS. 2 and 3, one having skill in the art will appreciate that, to secure an end of the pipeline segment 40 into the pipe connector segments 2 and 4, an end of the pipe segment 40 is inserted into the cavity C1 formed in connector segment 4 such that the outer surface of the pipe will engage the series of serrated edges 30i, formed in the inner surface 30a of middle section 30 included in connector segment 4, and the inner surface of the of the pipe will engage the series of serrated edges 52e formed in the outer surface 52b of inner compression connector segment 52. When the pipe segment 40 is properly seated within the cavity C1 formed in pipe segment 40, the end of the pipe segment 40 will engage the circumferential face 36a of ledge 36, formed on inner surface 30a of middle section 30 included in segment 4, and the circumferential face 60a, formed on outer surface 52b of the first inner compression connector component 52, such that the end of the pipe segment 40 cannot extend into the cavity C1 past the opposing ledges 36 and 60. One having skill in the art will appreciate that, in one or more embodiments, the end of a pipe segment 40 can also be secured to the pipe connector segment 2 by inserting the end of the pipeline segment 40 into the cavity C1 formed in connector segment 2 such that the outer surface of the pipe will engage the series of serrated edges 30i, formed in the inner surface 30a of middle section 30 included in connector segment 2, and the series of serrated edges 52e formed in the outer surface 52b of inner compression connector segment 52. In these embodiments, the first inner compression connector component 52 is connected to connector segment 2. One having skill in the art will also appreciate that the connector segment 2 and the connector segment 4 can be connected in a spaced-apart configuration before the end of the pipe segment 40 is inserted into the cavity C1 of connector segments 2 and 4, via vertical compression bolts 26, such that the diameter of the outer bore OB1 formed between the outer surface 52b of inner compression connector component 52 and the inner surface 30a of middle sections 30 included in connector segments 2 and 4 is greater than the outer diameter of the end of the pipe segment 40. In these embodiments, the end of the pipe segment may be inserted within the outer bore OB1 and, thereafter, the connector segments 2 and 4 can be compressed against the pipe segment 40 to secure the pipe segment 40 within the compression coupling.

As shown in FIGS. 2 and 3, when the connector segments 2 and 4 are brought together to interlockingly and sealingly connect the connector segment 2 to the connector segment 4, the vertical compression bolts 26a are inserted through the holes 22 and tightened to thereby draw the segments 2 and 4 towards one another to effect a fluid-tight connection between the connectors segments 2 and 4 and compress the outer surface of the pipe segment 40 such that the pipe 40 is securely engaged by the series of serrated edges 30i, formed in the inner surface 30b of middle sections 30 included in connector segments 2 and 4, and the series of serrated edges 52e formed in the outer surface 52a of inner compression connector component 52. The end of the pipe segment 40 engages the circumferential face 36a of ledge 36 and the opposing circumferential face 60a of ledge 60 to secure the pipe segment 40 within the outer bore OB1 and effect a fluid-tight seal between the inner compression connector 50 and the pipe segment 40. In one or more embodiments, the gaskets 92 and 94, as described herein, are disposed on one or both of the circumferential face 36a of ledge 36 and the circumferential face 60a of ledge 60, respectively, to effect a fluid-tight seal between the inner compression connector 50 and the pipe segment 40 when the pipe segment 40. In one or more embodiments described herein, the vent assurance ring 56 is disposed on the gaskets 92 and 94 disposed on circumferential face 36a and the circumferential face 60a to effect a fluid-tight seal between the vent assurance ring 56 and the segments connectors 2 and 4 and inner compression connector component 52 when the connector segments 2 and 4 are interlockingly connected to the end of a pipe segment 40. In this manner, gasses and fluids trapped in the annulus of a pipe segment 40 connected to pipe compression connector segments 2 and 4 are allowed to pass through the holes 56a disposed within the vent assurance ring 56 and through the pipe connector 1 to another pipe segment 40 connected to the connector 1 via pipe compression connector segments 6 and 8, as described herein. One having skill in the art with the benefit of the teachings herein appreciate that gasses and other fluids disposed in the annulus of one or more pipe segments connected to the pipe connector 1 can be vented utilizing suitable means known in the art that will not be discussed in detail herein.

One having skill in the art will appreciate that the end of a pipe segment 40 can be secured to the connector segments 6 and 8 in the same manner in which an end of a pipe segment 40 is secured to the connector segments 2 and 4, as described herein with respect to one or more embodiments. Once the connector segments 2 and 4 are interlockingly and sealingly connected to one another, and the connector segments 6 and 8 are interlockingly and sealingly connected to one another to secure respective ends of pipe segments 40 therein, connected connector segments 2,4 and connected connector segments 6,8 are brought together as shown in FIG. 3 to form a fluid-tight seal therebetween. As shown in FIGS. 1, 2 and 3, the holes 32 formed in the middle flanges 34 included in connector segments 2 and 4 are aligned with holes 76 formed in the middle flanges 74 included in the connectors segments 6 and 8 such that the horizontal compression bolts 26b are inserted through the holes 32 and the holes 76 and tightened to thereby draw the connected segments 2 and 4 towards the connected segments 6 and 8 to effect a fluid-tight connection therebetween. As connected segments 2 and 4 are brought towards the connected segments 6 and 8, the peripheral extension 80 formed on the first side of 70c of connected segments 6 and 8 is inserted into the peripheral groove 38 formed on the second side of connected segments 2 and 4. As shown with respect to FIGS. 1, 2 and 3, the cylindrical extension connector 84 formed on the first side 54c of the second inner compression connector component 54 is inserted into the inner surface 52a of the first inner compression connector component 52 such that the edge 84c of extension connector 84 engages the ledge 62, formed in the inner surface of 52a of the first inner compression connector component 52, and the outer surface 84b of extension connector 84 engages the mating surface 52e formed in the inner surface 52a. Once the edge 84c of extension connector 84 engages the ledge 62, circumferential face 86f of the second inner compression connector component is configured to engage the circumferential face 52f of the first inner compression connector component to form a press fit and a fluid-tight seal between the first and second inner compression connector components 52 and 54. In one or more embodiments, a gasket, as described herein, is disposed on one or both of the circumferential face 52f of the first inner compression connector component and the circumferential face 86f of the second inner compression connector component to effect a fluid-tight seal between the first and second inner compression connector components 52 and 54.

In one or more embodiments described herein, the vent assurance ring 100 is disposed on the gaskets 96 and 98 disposed on circumferential face 78a and the circumferential face 68a to effect a fluid-tight seal between the vent assurance ring 100 and the segments connectors 6 and 8 and inner compression connector component 54 when the connector segments 6 and 8 are interlockingly connected to the end of a pipe segment 40. In this manner, gasses and fluids trapped in the annulus of a pipe segment 40, connected to pipe compression connector segments 6 and 8, are allowed to pass through the holes 100a disposed within the vent assurance ring 100 and through the pipe connector 1 to another pipe segment 40 connected to the connector 1, via pipe compression connector segments 2 and 4, as described herein. One having skill in the art with the benefit of the teachings herein appreciate that gasses and other fluids disposed in the annulus of one or more pipe segments connected to the pipe connector 1 can be vented utilizing suitable means known in the art that will not be discussed in detail herein. In one or more embodiments, a gasket, as described herein can also be disposed on ledge 62 to effect a fluid-tight seal between the first and second inner compression connector components 52 and 54.

In one or more embodiments disclosed herein, the inner compression connector 50 is a single substantially cylindrical component, as opposed to the inner compression connector 50 including two inner compression connector components 52 and 54 as disclosed in other embodiments herein, and is a separate component from the pipe connector segments 2, 4, 6 or 8 before the connected segments 2 and 4 and connected segments 6 and 8 drawn towards one another utilizing the horizontal compression bolts 26 to compress the outer diameter of the ends of the pipe segments 40. In these embodiments, the end of a first pipe segment is secured to the first side 52c of the inner compression connector 50 by inserting the inner compression connector 50 into the end of the pipe segment 40 such that the inner diameter of the first pipe segment 40 will engage the series of serrated edges 52e, formed in the outer surface 52b of the inner compression connector 50, and the end of the pipe segment 40 will engage the circumferential face 60a, formed on outer surface 52b of the inner compression connector 50. When the pipe segment 40 is properly seated on the inner compression connector 50, the end of the pipe segment 40 cannot extend in an axial direction past the ledge 60. One having ordinary skill in the art will appreciate that the end of a second pipe segment can similarly be seated on the second side 70d of the inner compression connector 50 in the same manner as the end of the first pipe segment was seated on the first side 52c of the inner compression connector 50. One having skill in the art will appreciate that, once the ends of the two pipe segments 40 are seated on the respective ends of the inner compression connector 50, the compression connector segments 2 and 4 and the compression connector segments 6 and 8 can be sealingly and interlockingly connected to the pipe segments 40, as disclosed herein, to effect the configuration of the compression coupling fitting to couple the two pipe segments 40 together in a fluid-tight manner.

In one or more embodiments disclosed herein, the inner compression connector 50 is a single substantially cylindrical component as opposed to including two inner compression connector components 52 and 54 and is connected to one of the pipe connector segments 2, 4, 6 or 8 before the pipe segments are drawn towards one another utilizing the horizontal compression bolts 26. In these embodiments, one having skill in the art will appreciate that the connection effected between the pipe connector 1 and an end of the pipe segments 40 will be performed in a similar manner as described above.

One having skill in the art will appreciate that the pipe connector 1 shown in FIGS. 1, 2 and 3 provides for the separate communication of fluids within the pipe connector 1. For example, fluids disposed or trapped within the annulus of pipeline segments 40 connected to the pipe connector 1≠fluids including, for example, liquids, hydrocarbons or gasses—are communicated through the fluid-tight and sealingly connected outer bores OB1 and OB2 formed in the pipe connector 1 when the each of the connector segments 2,4 and 6,8 are connected as shown in FIG. 3, and fluids transported within the inner diameter of pipeline segments 40 connected to the pipe connector 1 are communicated through the fluid-tight and sealingly connected central bores 58a and 58b formed in the pipe connector 1 when the each of the connector segments 2,4 and 6,8 are connected, as shown in FIG. 3, such that the fluids disposed within outer bores OB1 and OB2 formed in the pipe connector 1 and the fluids disposed within central bores 58a and 58b are kept separate from one another.

It is to be understood that the present invention is not limited to the embodiment(s) described above and illustrated herein, but encompasses any and all variations falling within the scope of the appended claims. For example, one having ordinary skill will appreciate that one or more embodiments of the present invention can be utilized as an end-fitting or end-coupling in a pipeline once the connector segments 2 and 4 and an inner compression connector (disclosed herein), or connector segments 6 and 8 and an inner compression connector are connected to one another to secure an end of a pipeline therein, as disclosed in one or more embodiments of the present invention. Thus, references to the present invention herein are not intended to limit the scope of any claim or claim term, but instead merely make reference to one or more features that may be covered by one or more of the claims. Materials, processes and numerical examples described above are exemplary only, and should not be deemed to limit the claims.

I claim:

1. A pipe connector, the pipe connector comprising:
   a first pipe compression connector segment;
   a second pipe compression connector segment, wherein each of the first and second pipe connector segments comprises
      a middle section including first and second opposing sides, first and second opposing ends, an inner surface and an outer surface; wherein the inner surface of the middle section forms a first cavity with a radius of curvature configured to engage an outer diameter of an end of a first pipe;
      a first flange disposed on and extending away from the first side, wherein the first flange has a number of holes extending therethrough;
      a second flange disposed on and extending away from the second side, wherein the second flange has a number of holes extending therethrough;
   an inner compression connector, disposed within the first cavity of the first and second pipe connector segments, including a first end, a second end, an inner surface and an outer surface; wherein the inner surface of the inner compression connector forms a central bore extending the length of the inner compression connector, and wherein the outer surface of the inner compression connector is configured to engage an inner diameter of an end of the first pipe; and
   a number of vertical compression bolts configured to engage the number of holes extending through the first and second flanges to interlockingly connect the first and second pipe connector segments such that a first outer bore is formed between the inner surface of the middle section and the outer surface of the inner compression connector.

2. The pipe connector of claim 1, wherein the first and second pipe connector segments further comprise a first series of serrated edges formed in the inner surface of the middle section, wherein the series of serrated edges are configured to engage an outer surface of the first pipe,
   wherein the inner compression connector further comprises a second series of serrated edges formed on the outer surface of the first end of the inner compression connector, and
   wherein the first series of serrated edges and the second series of serrated edges oppose each other and are configured to engage an outer surface of the first pipe when the first pipe is inserted into the first outer bore.

3. The pipe connector of claim 1, wherein a first gasket is positioned between the first flanges and a second gasket is positioned between the second flanges, wherein a fluid-tight seal is formed when the first pipe connector segment is interlockingly connected to the second pipe connector segment.

4. The pipe connector of claim 1, wherein the first and second pipe connector segments further comprise a first ledge formed in the inner surface of the middle section, wherein the outer surface of the inner compression connector further comprises a second ledge, and wherein the first ledge and the second ledge oppose each Other and are configured to engage an end of the first pipe when the first pipe is inserted into the first outer bore.

5. The pipe connector of claim 4, wherein a first gasket is positioned on the first ledge and a second gasket is positioned on the second ledge, and wherein the first and the second gaskets are configured such that a fluid-tight seal is formed between the end of the first pipe and the inner surface of the inner compression connector when the first ledge and the second ledge engage the end of the first pipe.

6. The pipe connector of claim 1, wherein the pipe connector further comprises:
   a third pipe compression connector segment;
   a fourth pipe compression connector segment; wherein each of the third and fourth pipe connector segments comprises
      a middle section including first and second opposing sides, first and second opposing ends, an inner surface, and an outer surface; wherein the inner surface of the third and fourth connector segments forms a second cavity with a radius of curvature configured to engage an outer diameter of an end of a second pipe;
      a third flange disposed on and extending away from the first side, wherein the third flange has a number of holes extending therethrough,
      a fourth flange disposed on and extending away from the second side, wherein the fourth flange has a number of holes extending therethrough; and
   a number of vertical compression bolts configured to engage the number of holes extending through the third and fourth flanges of the third and fourth connector segments to interlockingly connect the third and fourth pipe connector segments.

7. The pipe connector of claim 6, wherein each of the first and second pipe connector segments further comprises a fifth flange disposed on and extending away from the outer surface of the middle section in a substantially perpendicular direction to an axis of the first cavity, wherein the fifth flange has a number of holes extending therethrough,
   wherein each of the third and fourth pipe connector segments further comprises a sixth flange disposed on and extending away from the outer surface of the middle section in a substantially perpendicular direction to an axis of the second cavity, wherein the sixth flange has a number of holes extending therethrough, and wherein a number of horizontal compression bolts configured to engage the number of holes extending through the fifth flange of the first and second pipe connector segments and the sixth flange of the third and fourth connector segments to connect the first and second pipe connector segments to the third and fourth pipe connector segments such that a second outer bore is formed between the second cavity and the outer surface of the inner compression connector.

8. The pipe connector of claim 7, wherein each of the fourth and third pipe connector segments further comprises a first series of serrated edges formed in the inner surface of the middle section, wherein the series of serrated edges are configured to engage an outer surface of the second pipe,
wherein the inner compression connector further comprises a second series of serrated edges formed on the outer surface of the second end of the inner compression connector, and
wherein the first series of serrated edges and the second series of serrated edges oppose each other and are configured to engage an outer surface of the second pipe when the second pipe is inserted into the second outer bore.

9. The pipe connector of claim 6, wherein the middle section of each of the first and second pipe connector segments further comprises a peripheral groove formed in a planar surface disposed on the second side of the middle section, wherein the peripheral groove extends in a circumferential direction that is substantially perpendicular to an axis of the first cavity,
wherein the middle section of the third and fourth pipe connector segments further comprises a peripheral extension that extends from a planar surface disposed on the first end of the middle section, wherein the peripheral extension extends in a circumferential direction that is substantially perpendicular to an axis of the second cavity, and
wherein the peripheral groove is configured to engage the peripheral extension to connect the first and second pipe connector segments to the third and fourth pipe connector segments.

10. The pipe connector of claim 9, wherein the inner surface of the middle section of the third and fourth pipe connector segments comprises a first ledge, and wherein the outer surface of the inner compression connector further comprises a second ledge, wherein the first ledge and the second ledge oppose each other and are configured to engage an end of the second pipe when the second pipe is inserted into the second outer bore.

11. The pipe connector of claim 10, wherein a first gasket is positioned on the first ledge and a second gasket is positioned on the second ledge, and wherein the first and the second gaskets are configured such that a fluid-tight seal is formed between the end of the second pipe and the inner surface of the inner compression connector when the first ledge and the second ledge engage the end of the second pipe.

12. The pipe connector of claim 6, wherein the inner compression connector further comprises a first inner compression connector component and a second inner compression connector component, wherein the first inner compression connector component is disposed within the first cavity and the second inner compression connector component is disposed within the second cavity, and wherein the first and second inner compression connector components are matingly connected to one another when the first and second connector components are interlockingly connected to the third and fourth connector components such that an inner surface of the first inner compression connector component and an inner surface of the second inner compression connector component form the central bore extending through the inner compression connector.

13. The pipe connector of claim 12, wherein the inner surface of the first inner compression connector component comprises a mating surface, wherein the second inner compression connector component comprises a connector extension, and wherein the mating surface and the connector extension are configured to engage one another to form a fluid-tight press-fit connection when the first and second connector components are interlockingly connected to the third and fourth connector components.

14. The pipe connector of claim 1, wherein the central bore is configured to convey a first fluid disposed in the inner diameter of the first pipe, and wherein the first outer bore is configured to convey a second fluid disposed in an annulus of the first pipe.

15. A method of forming a pipe connector, comprising:
forming a first pipe compression connector segment;
forming a second pipe compression connector segment, wherein each of the first and second pipe connector segments comprises
a middle section including first and second opposing sides, first and second opposing ends, an inner surface, and an outer surface; wherein the inner surface of the middle section forms a first cavity with a radius of curvature configured to engage an outer diameter of an end of a first pipe;
a first flange disposed on and extending away from the first side, wherein the first flange has a number of holes extending therethrough,
a second flange disposed on and extending away from the second side, wherein the second flange has a number of holes extending therethrough;
forming an inner compression connector, disposed within the first cavity of the first and second pipe connector segments, including a first end, a second end, an inner surface and an outer surface, wherein the inner surface of the inner compression connector forms a central bore extending the length of the inner compression connector, and wherein the outer surface of the inner compression connector is configured to engage an inner diameter of an end of the first pipe;
forming a number of vertical compression bolts;
securing the first and second pipe connector segments to one another by engaging the number of holes extending through the first and second flanges with the number of bolts; and
tightening the bolts to interlockingly connect the first and second pipe connector segments such that a first outer bore is formed between the inner surface of the middle section and the outer surface of the inner compression connector.

16. The method of claim 15 further comprising:
forming a first series of serrated edges in the inner surface of the middle section of the first and second pipe connector segments; wherein the first series of serrated edges are configured to engage an outer surface of the first pipe; and
forming a second series of serrated edges in the outer surface of the first end of the inner compression connector; wherein the serrated edges formed in the inner surface Of the first and second pipe connector segments and the serrated edges formed in the outer surface of the inner compression connector oppose each other and are configured to engage an outer surface of the first pipe when the first pipe is inserted into the first outer bore.

17. The method of claim 15, further comprising:
forming a third pipe compression connector segment;

forming a fourth pipe compression connector segment;
wherein each of the third and fourth pipe connector segments comprises
- a middle section including first and second opposing sides, first and second opposing ends, an inner surface, and an outer surface; wherein the inner surface of the third and fourth connector segments forms a second cavity with a radius of curvature configured to engage an outer diameter of an end of a second pipe;
- a third flange disposed on and extending away from the first side, wherein the third flange has a number of holes extending therethrough;
- a fourth flange disposed on and extending away from the second side, wherein the fourth flange has a number of holes extending therethrough; and forming a number of vertical compression bolts;
securing the third and fourth pipe connector segments to one another by engaging the number of holes extending through the third and fourth flanges with the number of bolts, and
tightening the bolts to interlockingly connect the third and fourth pipe connector segments.

18. The method of claim 17, wherein each of the first and second pipe connector segments further comprises a fifth flange disposed on and extending away from the outer surface of the middle section in a substantially perpendicular direction to an axis of the first cavity, wherein the fifth flange has a number of holes extending therethrough, wherein each of the third and fourth pipe connector segments further comprises a sixth flange disposed on and extending away from the outer surface of the middle section in a substantially perpendicular direction to an axis of the second cavity, wherein the sixth flange has a number of holes extending therethrough.

19. The method of claim 18, further comprising:
forming a number of horizontal compression bolts;
securing the connected first and second pipe connector segments to the connected third and fourth pipe connector segments by engaging the number of holes extending through the fifth and sixth flanges with the number of bolts; and
tightening the bolts to interlockingly connect the connected first and second pipe connector segments to the connected third and fourth pipe connector segments such that a second outer bore is formed between the second cavity and the outer surface of the inner compression connector.

20. The method of claim 19, further comprising:
forming a first series of serrated edges in the inner surface of the middle section of the third and fourth pipe connector segments; wherein the first series of serrated edges are configured to engage an outer surface of the first pipe; and
forming a second series of serrated edges in the outer surface of the second end of the inner compression connector;
wherein the serrated edges formed in the inner surface of the third and fourth pipe connector segments and the serrated edges formed in the outer surface of the second end of the inner compression connector oppose each other and are configured to engage an outer surface of the second pipe when the second pipe is inserted into the second outer bore.

* * * * *